(12) United States Patent
Fukuda

(10) Patent No.: US 10,212,357 B2
(45) Date of Patent: *Feb. 19, 2019

(54) IMAGING APPARATUS AND CONTROL METHOD TO REALIZE ACCURATE EXPOSURE

(71) Applicant: SONY CORPORATION, Tokyo (JP)

(72) Inventor: Akira Fukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,172

(22) Filed: Dec. 4, 2017

(65) Prior Publication Data

US 2018/0091721 A1    Mar. 29, 2018

Related U.S. Application Data

(63) Continuation of application No. 14/224,708, filed on Mar. 25, 2014, now Pat. No. 9,871,973.

(30) Foreign Application Priority Data

Apr. 15, 2013  (JP) ................................. 2013-084569

(51) Int. Cl.
  *H04N 5/235* (2006.01)
(52) U.S. Cl.
  CPC ................................. *H04N 5/2353* (2013.01)
(58) Field of Classification Search
  CPC .................................................. H04N 5/2353
  See application file for complete search history.

(56) References Cited

U.S. PATENT DOCUMENTS 7,852,396 B2   12/2010   Narukawa et al.
2003/0184661 A1   10/2003   Yubata et al.
(Continued)

FOREIGN PATENT DOCUMENTS

CN   101031032 A   9/2007
CN   100579180 C   1/2010
(Continued)

OTHER PUBLICATIONS

Office Action for CN Patent Application No. 201410137409.8, dated Feb. 5, 2018, 9 pages of Office Action and 27 pages of English Translation.
(Continued)

*Primary Examiner* — Twyler L Haskins
*Assistant Examiner* — Fayez Bhuiyan
(74) *Attorney, Agent, or Firm* — Chip Law Group

(57) ABSTRACT

An imaging apparatus includes an imaging unit configured to image a subject, a photometry unit, an exposure compensation unit, an exposure control unit configured to control exposure for a captured image and a display control unit configured to control display of the captured image on a display unit. The photometry unit is configured to perform photometry, based the imaging unit's output, to obtain an exposure value. The exposure compensation unit is configured to compensate the obtained exposure value to an exposure value that would be used for exposure control, if photometry of the photometry unit is not fixed. The exposure control unit is configured to allow exposure control at an exposure value within wider range than a range of available exposure values of the cases where photometry of the photometry unit was not fixed, if photometry of the photometry unit is fixed.

20 Claims, 7 Drawing Sheets

(56) References Cited

U.S. PATENT DOCUMENTS

2004/0125220 A1    7/2004   Fukuda et al.
2006/0285008 A1   12/2006   Segawa et al.
2008/0187235 A1    8/2008   Wakazono

FOREIGN PATENT DOCUMENTS

CN      102984461 A    3/2013
JP      2007-235786 A    9/2007

OTHER PUBLICATIONS

Notice of Allowance for U.S. Appl. No. 14/224,708, dated Sep. 8, 2017, 11 pages.
Advisory Action for U.S. Appl. No. 14/224,708, dated Jul. 29, 2016, 02 pages.
Non-Final Office Action for U.S. Appl. No. 14/224,708, dated Apr. 6, 2017, 12 pages.
Final Office Action for U.S. Appl. No. 14/224,708, dated May 20, 2016, 11 pages.
Non-Final Office Action for U.S. Appl. No. 14/224,708, dated Oct. 22, 2015, 09 pages.

IMAGING APPARATUS AND CONTROL METHOD TO REALIZE ACCURATE EXPOSURE

CROSS REFERENCE TO RELATED APPLICATIONS

This is a continuation application of U.S. patent application Ser. No. 14/224,708 filed on Mar. 25, 2014, which claims priority from Japanese Priority Patent Application 2013-084569 filed in the Japanese Patent Office on Apr. 15, 2013. Each of the above referenced applications is hereby incorporated by reference in its entirety.

BACKGROUND

The present disclosure relates to imaging apparatuses, control methods and programs. More particularly, the present disclosure relates to imaging apparatuses, control methods and programs which are capable of realizing accurate exposure.

In recent years, digital still cameras such as digital single-lens reflex cameras and compact digital cameras have been widespread. Most of these digital still cameras have an auto-exposure function (Auto Exposure; hereinafter also referred to as "AE").

These kinds of digital still cameras may also have an exposure compensation function for allowing a user to manually raise and lower the exposure value in cases such as when a person's face is too dark with AE activated because the exposure is too low; and otherwise when it is too bright.

Exposure compensation is usually performed as a process of setting an EV value (Exposure Value) (see, for example, Japanese Patent Application Laid-Open No. 2007-235786). For example, as the range of the EV value that can be set, an EV value that is thought to be appropriate would be set within the range from −3.0 EV to 3.0 EV.

SUMMARY

In cases where a result of exposure compensation is intended to be reflected on a captured image that would be displayed during live view display (hereinafter referred to as "live-view image"), it may be necessary to perform accurate photometry in order to obtain the luminance value that serves as a reference of compensation. However, since the result of exposure compensation would be reflected on the live-view image, image signals that would be taken in for live view display, taken in from the image sensor, may gradually deviate from the appropriate exposure; and it may finally reach a level where accurate photometry is not available.

Therefore, in cases where the result of exposure compensation is intended to be reflected on the live-view image, a range of available exposure compensation may need to be limited within a range where accurate photometric values can be obtained from an output of the image sensor. In the above case, for example, the range of available exposure compensation would be limited by the range from −3.0 EV to 3.0 EV.

Thus, as it is possible to keep accuracy in photometry but the range of available exposure compensation is limited, there has been a demand that the result of exposure compensation within wider range should also be reflected on the live-view image; so that the result can be checked.

In view of the above-mentioned circumstances, it is desirable to realize accurate exposure by widening the range in which a result of the exposure compensation can be checked.

According to an embodiment of the present disclosure, there is provided an imaging apparatus including an imaging unit, a photometry unit, an exposure compensation unit, an exposure control unit and a display control unit.

The imaging unit is configured to image a subject.

The photometry unit is configured to perform photometry, based on an output of the imaging unit, to obtain an exposure value.

The exposure compensation unit is configured to compensate the exposure value that has been obtained by photometry to an exposure value that would be used for exposure control, in cases where photometry of the photometry unit is not fixed.

The exposure control unit is configured to control exposure for a captured image that is imaged by the imaging unit. The exposure control unit is further configured to allow exposure control at an exposure value within a range which is wider than a range of available exposure values of the cases where photometry of the photometry unit was not fixed, in cases where photometry of the photometry unit is fixed.

The display control unit is configured to control display of the captured image on a display unit.

The display control unit may display on the display unit the captured image on which a result of exposure compensation is reflected.

The exposure compensation unit may allow setting a range of available exposure compensation within a range which is wider than a range of available exposure compensation of the cases where photometry of the photometry unit was not fixed.

The imaging apparatus further includes AE lock for fixing photometry of the photometry unit to fix exposure. If the AE lock is enabled, the exposure compensation unit may allow setting the range of available exposure compensation within a range which is wider than the range of available exposure compensation of the cases where photometry of the photometry unit was not fixed; and if the AE lock is disabled, the exposure compensation unit may allow setting the range of available exposure compensation within the range of available exposure compensation of the cases where photometry of the photometry unit was not fixed.

The exposure compensation unit may allow setting the range of available exposure compensation without limiting the range, if the AE lock is enabled.

The imaging apparatus further includes a switching unit configured to switch to enable and disable the AE lock.

The range of available exposure compensation may be set in a plurality of stages depending on EV values.

The imaging apparatus may be an independent apparatus, or may be an internal block making up one device.

According to other embodiments of the present disclosure, there are also provided a control method and a program including the features corresponding to the imaging apparatus of the above-mentioned embodiment of the present disclosure.

In the imaging apparatus, the control method, and the program of the embodiments of the present disclosure, photometry is performed based on an output of the imaging unit to obtain an exposure value.

In cases where photometry of the photometry unit is not fixed, the exposure value that has been obtained by photometry would be compensated to an exposure value that would be used for exposure control.

Exposure for a captured image is controlled.

Display of the captured image on a display unit is controlled.

In cases where photometry of the photometry unit is fixed, it allows exposure control at an exposure value within a range which is wider than a range of available exposure values of the cases where photometry of the photometry unit was not fixed.

Thus, an embodiment of the present disclosure is able to realize accurate exposure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

<Configuration Example of Digital Still Camera>

Figure 1:
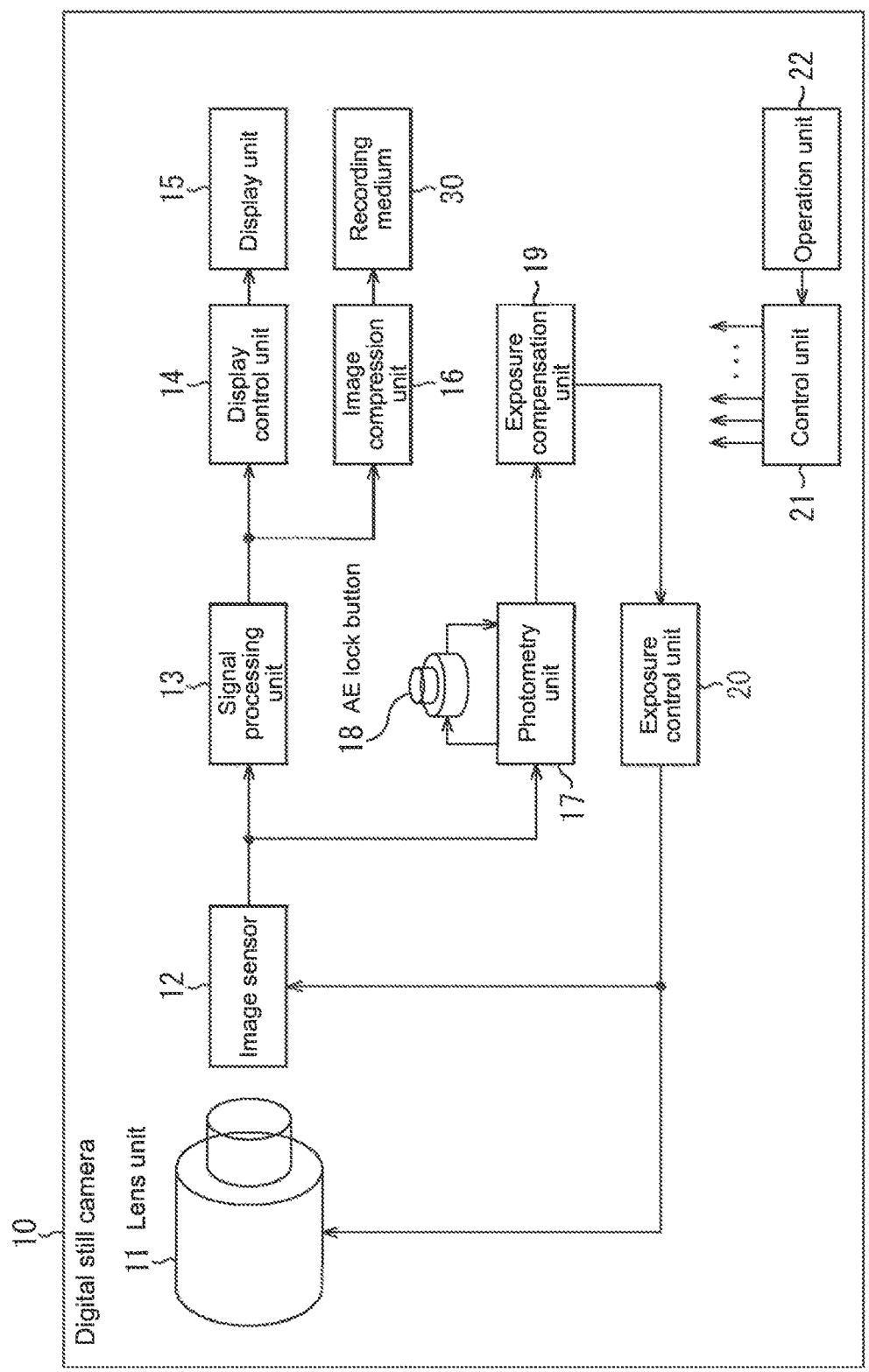
FIG. 1 is a figure showing a configuration of an embodiment of a digital still camera to which the present disclosure is applied.

FIG. 1 is a figure showing a configuration of an embodiment of a digital still camera to which the present disclosure is applied.

The digital still camera 10 serves as a camera such as digital single-lens reflex cameras and compact digital cameras, which records, as image data of digital signals, a captured image that is imaged by a solid-state image sensing device.

The digital still camera 10 includes a lens unit 11, an image sensor 12, a signal processing unit 13, a display control unit 14, a display unit 15, an image compression unit 16, a photometry unit 17, an AE lock button 18, an exposure compensation unit 19, an exposure control unit 20, a control unit 21 and an operation unit 22. Further, a recording medium 30 for recording the image data of the captured image may be mounted to the digital still camera 10 as appropriate.

The image sensor 12 may be made up of a solid-state image sensing device such as CMOS (Complementary Metal Oxide Semiconductor) sensor. The image sensor 12 may allow photoelectric conversion upon receiving the light that enters the lens unit 11 from a subject; and supply analog image signals corresponding to each amount of the received light to the signal processing unit 13 and the photometry unit 17.

The signal processing unit 13 applies analog signal processing such as amplification to the analog image signals coming from the image sensor 12; and then A/D (Analog/Digital) converts the resulting image signals. Further, the signal processing unit 13 applies digital signal processing such as noise removal processing to the image data indicated by the digital signals obtained by the A/D conversion; and then supplies the resulting image data to the display control unit 14 and the image compression unit 16.

The display control unit 14 is configured to allow the captured image that corresponds to the image data coming from the signal processing unit 13 to be displayed on the display unit 15. The display unit 15 may be made up of an LCD (Liquid Crystal Display), OELD (Organic Electroluminescence Display), or the like.

The image compression unit 16, under the control of the control unit 21, compresses the image data coming from the signal processing unit 13 in accordance with a predetermined compression format such as JPEG (Joint Photographic Experts Group) format. The image compression unit 16 may allow the compressed image data to be recorded on the recording medium 30. The recording medium 30 may be a recording medium such as a memory card, for example, which can be easily mounted and demounted from the digital still camera 10.

A photometry unit 17 is configured to perform photometry based on the image signals coming from the image sensor 12. The photometry unit 17 may calculate an appropriate exposure value, based on a luminance value that has been obtained as a photometric value, and supplies the calculated exposure value to the exposure compensation unit 19.

The AE lock button 18 is a button which is configured to switch to enable and disable AE lock (AEL: Auto Exposure Lock) depending on a user's operation. Herein, the AE lock means a function of stopping (fixing) photometry by the photometry unit 17 and fixing the exposure.

When the AE lock button 18 is pressed, AE locking is performed and the exposure is fixed. In other words, in cases where the AE lock button 18 is pressed and enabled, the AE lock would be enabled and the photometry unit 17 would stop to fix photometry. On the other hand, in cases where the AE lock button 18 is cancelled and disabled, the AE lock is disabled, the photometry unit 17 performs photometry, and photometry is not fixed.

Therefore, in cases where the AE lock is disabled, photometry is performed by the photometry unit 17, and the exposure value calculated from the luminance value would be supplied to the exposure compensation unit 19. On the other hand, in cases where the AE lock is enabled, photometry by the photometry unit 17 is not performed, but an exposure value calculated from the control value, which control value is used for the exposure control at that time, would be supplied to the exposure compensation unit 19.

It should be noted that the AE lock button 18 may be a separate button to which this function is assigned, or may be configured to realize the same function by such as a shutter button when it is pressed halfway down.

The exposure compensation unit 19 is configured to compensate the exposure value coming from the photometry unit 17, to an exposure value that would be used for exposure control, and supply the resulting exposure value to the exposure control unit 20.

In the digital still camera 10, there is provided an exposure compensation function for allowing the user to manually raise and lower the exposure value in cases such as when a person's face is too dark with AE activated because the exposure is too low; and otherwise when it is too bright. This exposure compensation may be performed as a process of setting an arbitrary EV value through a predetermined setting screen. That is, the exposure value that would be used for exposure control is an exposure value that can be obtained by compensation by shifting the exposure value from the photometry unit 17 in accordance with the set EV value.

Further, the exposure compensation unit 19 is configured to allow exposure compensation within a certain range, in cases where the AE lock is disabled and photometry by the photometry unit 17 is not fixed. However, in addition, the exposure compensation unit 19 is configured to allow exposure compensation within a range which is wider than the range in the cases where photometry of the photometry unit was not fixed, in cases where the AE lock is enabled and photometry of the photometry unit is fixed.

The exposure control unit 20 is configured to perform exposure control, based on the exposure value after compensation coming from the exposure compensation unit 19, on the captured image obtained from an output of the image sensor 12. In this case, in order to allow imaging to be performed at an appropriate exposure condition, control is performed by the exposure control unit 20 with the use of control values such as sensitivity of the image sensor 12 (SV: Sensitivity Value), shutter speed thereof (TV: Time Value), and an aperture value of the lens aperture (AV: Aperture Value). Thus, on the display unit 15, the captured image whose exposure is controlled would be live-view displayed. In other words, the result of exposure compensation would be reflected on the live-view image.

The control unit 21 is configured to control various parts of the digital still camera 10. Further, the control unit 21 performs various kinds of process in response a signal from the operation unit 22.

The operation unit 22 corresponds to a shutter button, a zoom button, a mode dial, a power switch, and other various buttons, switches and the like which are mounted on the digital still camera 10. The operation unit 22 supplies the signals corresponding to the operation, to the control unit 21, when these buttons, and the like, are operated.

In thus configured digital still camera 10, the image sensor 12 would allow photoelectric conversion upon receiving the light that enters the lens unit 11 from the subject; and outputs the analog image signals obtained as a result. The analog image signals output from the image sensor 12 becomes the image data indicated by the digital signals by being processed by the signal processing unit 13. The image data would be supplied to the display control unit 14. Thus, on the display unit, the live-view image would be displayed.

After that, when the user operates the shutter button, the signal corresponding to this operation would be supplied from the operation unit 22 to the control unit 21. When the signal corresponding to the operation of the shutter button is supplied to the control unit 21 from the operation unit 22, the control unit 21 may control the signal processing unit 13 and the image compression unit 16 to allow the A/D converted image data at that time to be compressed in JPEG format, and then allow the image data obtained as a result to be recorded on the recording medium 30.

In this way, a so-called photography is performed.

Now, as described above, in the digital still camera 10, the exposure may be automatically adjusted appropriately by the auto-exposure function (AE), but since it might not always result in appropriate exposure, there is provided an exposure compensation function for allowing the user to manually set the exposure value. In the following, some pieces of processing involved in exposure compensation performed by the digital still camera 10 will be described.

<Live View Display Processing>

Figure 2:
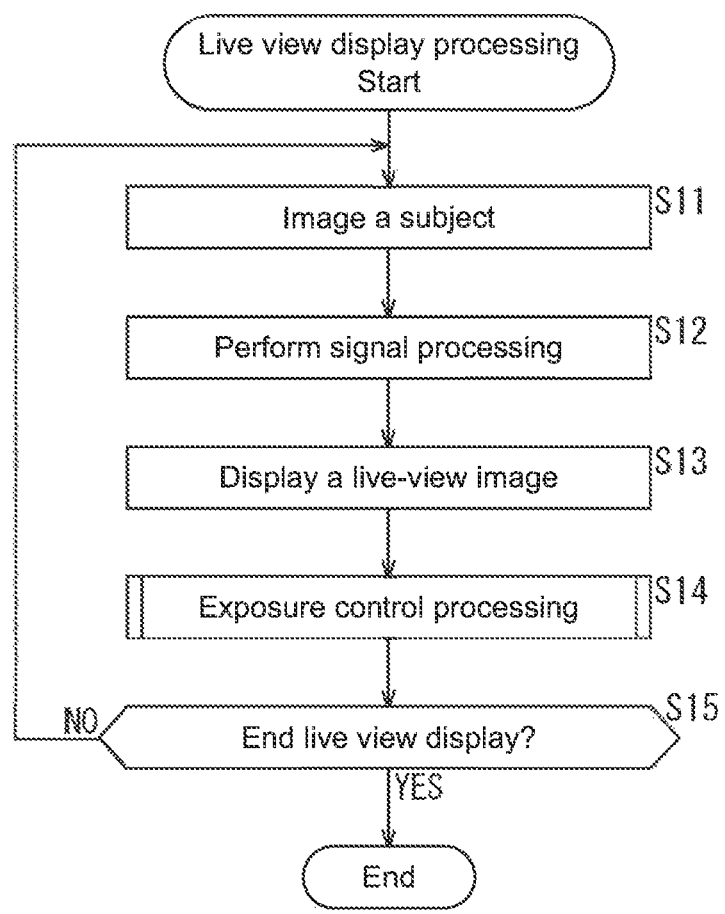
FIG. 2 is a flowchart for illustrating a live view display processing.

First, with reference to the flowchart of FIG. 2, a live view display processing performed by the digital still camera 10 of FIG. 1 will be illustrated.

In the step S11 the image sensor 12 images the subject and obtains the analog image signals corresponding to the amount of light received from the subject. In the step S12, the signal processing unit 13 applies the predetermined signal processing to the image signals coming from the image sensor 12, to obtain the image data.

In the step S13, the display control unit 14 allows the live-view image to be displayed on the display unit 15, based on the image data coming from the signal processing unit 13.

In the step S14, an exposure control processing would be performed. In this exposure control processing, the exposure value that would be used for exposure control is compensated in accordance with the enabled or disabled state of the AE lock button 18. Then, exposure for the captured image would be controlled on the basis of the exposure value after compensation. It should be noted that the detail of the exposure control processing will be described later with reference to a flowchart of FIG. 3.

In the step S15, it is determined whether or not to end the live view display.

In the step S15, if it is determined that the live view display is to be continued, the process returns to the step S11 and the process thereafter would be repeated. Therefore, by repeating the process from the step S11 to the step S14, the live-view image on which the result of exposure compensation is reflected would be displayed on the display unit 15.

Otherwise, in the step S15, if it is determined that the live view display should be finished, the live view display processing of FIG. 2 may be completed.

The above is the description of the live view display processing.

<Exposure Control Processing>

Figure 3:
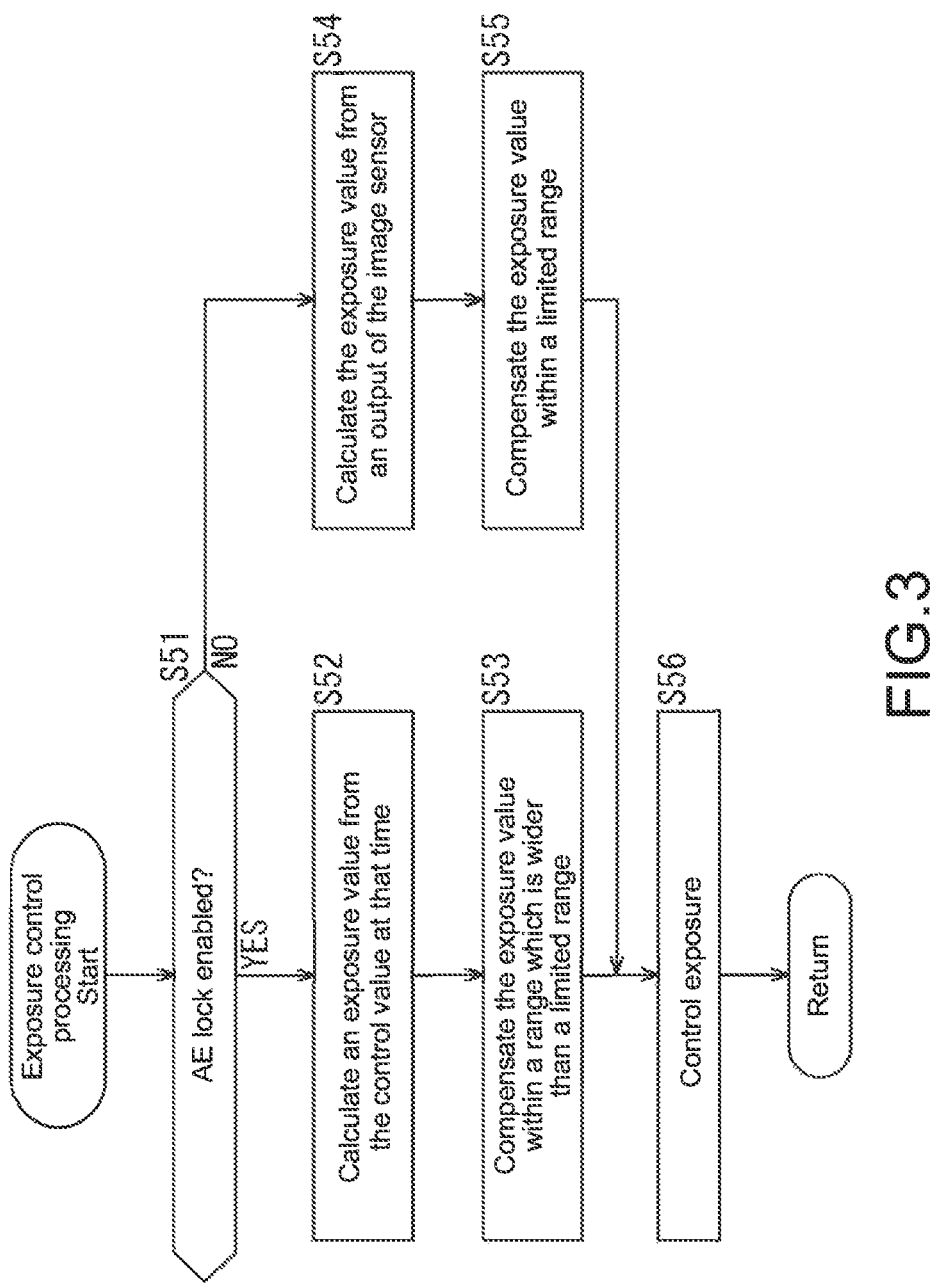
FIG. 3 is a flowchart for illustrating an exposure control processing.

Next, with reference to the flowchart of FIG. 3, the exposure control processing corresponding to the step S14 of FIG. 2 will be illustrated.

In the step S51, the control unit 21 monitors the state of the AE lock button 18 and determines whether or not the AE lock is enabled.

In the step S51, if it is determined that the AE lock is enabled, the process goes to the step S52. In the step S52, the photometry unit 17, under the control of the control unit 21, calculates the exposure value based on the control value that has been used for the exposure control at that time. It should be noted that examples of the control value that may be used include sensitivity of the image sensor 12 (SV), shutter speed thereof (TV), the aperture value of the lens aperture (AV), and the like.

In the step 53, the exposure compensation unit 19 compensates the exposure value obtained by the photometry unit 17 to the exposure value that would be used for exposure control, within a range which is wider than a limited range that does not affect photometry by the photometry unit 17.

Therefore, in cases where the AE lock is enabled and photometry by the photometry unit 17 is fixed, exposure compensation becomes available within a range which is wider than the limited range that does not affect photometry by the photometry unit 17.

In this case, for example, as the limited range, if exposure compensation was available within the range from −3.0 EV to +3.0 EV, as the range which is wider than the limited range, for example, exposure compensation may be available within the range from −5.0 EV to +5.0 EV, or may be available in an unlimited range without upper or lower limits, or the like. Then, the exposure compensation unit 19 compensates by shifting the exposure value from the photometry unit 17 in accordance with the EV value (for example, +5.0 EV). It should be noted that such a range of available exposure compensation may be appropriately set by the user. The detail of an exposure compensation setting processing of the cases where the AE lock is enabled will be described later with reference to FIGS. 4 and 5.

On the other hand, in the step S51, if it is determined that the AE lock is disabled, the process goes to the step S54. In the step S54, the photometry unit 17 performs photometry based on the output of the image sensor 12, analyses the luminance value obtained as a result and calculates an appropriate exposure value.

In the step S55, the exposure compensation unit 19 compensates the exposure value obtained by the photometry unit 17 to the exposure value that would be used for exposure control, within the limited range that does not affect photometry by the photometry unit 17.

Therefore, in cases where the AE lock is disabled and photometry by the photometry unit 17 is not fixed, exposure compensation becomes available within the limited range that does not affect photometry by the photometry unit 17.

In this case, for example, as the limited range, exposure compensation may be available within the range from −3.0 EV to +3.0 EV. Then, the exposure compensation unit 19 compensates by shifting the exposure value from the photometry unit 17 in accordance with the EV value (for example, −2.0 EV). It should be noted that such a range of available exposure compensation may be appropriately set by the user. The detail of an exposure compensation setting processing of the cases where the AE lock is disabled will be described later with reference to FIGS. 4 and 6.

After compensating the exposure value by the step S53 or the step S55, the process goes to the step S56. In the step S56, the exposure control unit 20 performs exposure control, based on the exposure value after compensation by the exposure compensation unit 19, on the captured image obtained from the image sensor 12. For example, in cases where photometry of the photometry unit 17 is fixed, the exposure control unit 20 would perform exposure control at an exposure value within the range which is wider than the range of the cases where photometry of the photometry unit 17 was not fixed.

Upon completing the process of the step S56, the process returns to the step S14 of FIG. 2 and the process thereafter would be performed.

The above is the description of the exposure control processing.

<Exposure Compensation Setting Processing>

Figure 4:
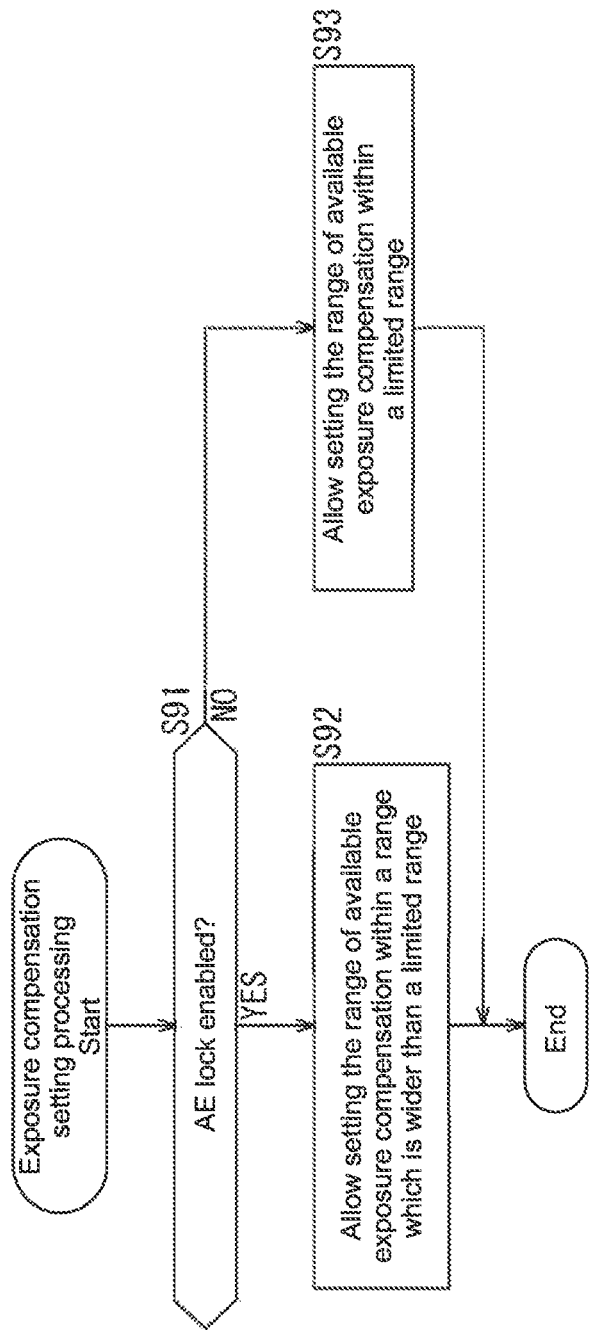
FIG. 4 is a flowchart for illustrating an exposure compensation setting processing.

Next, with reference to the flowchart of FIG. 4, the exposure compensation setting processing will be illustrated. It should be noted that this exposure compensation setting processing would be performed in cases such as when exposure compensation has been ordered by the user's operation at the time of photographing and the predetermined setting screen is displayed.

In the step S91, the control unit 21 monitors the state of the AE lock button 18 and determines whether or not the AE lock is enabled.

In the step S91, if it is determined that the AE lock is enabled, the process goes to the step S92. In the step S92, the exposure compensation unit 19 allows setting the range of available exposure compensation within a range which is wider than the limited range that does not affect photometry by the photometry unit 17.

Figure 5:
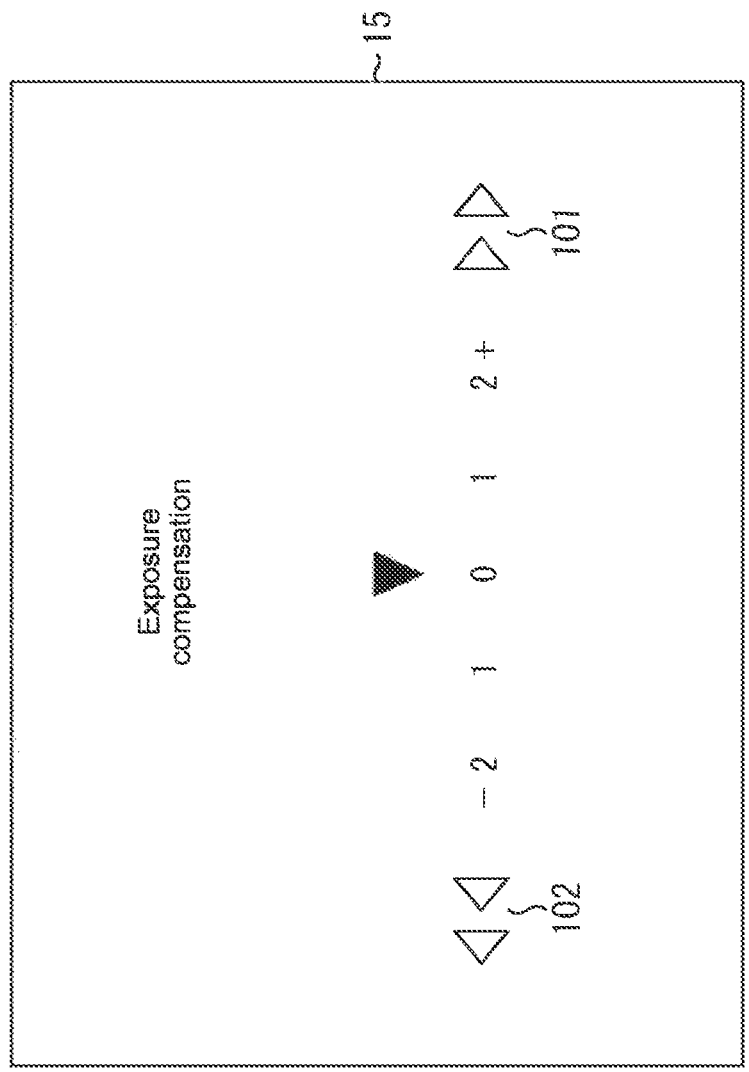
FIG. 5 is a figure showing a specific example of exposure compensation setting when AE lock is enabled.

FIG. 5 is a figure showing an example of the setting screen of exposure compensation of the cases where the AE lock is enabled.

As shown in FIG. 5, the range of available exposure compensation may be set in a plurality of stages depending on EV values, and by operating the buttons 101 and 102, a desired EV value may be selected in an unlimited range without upper or lower limits. This allows the user to set practically infinite range of exposure compensation without being restricted by the limited range that is for keeping accuracy in photometry; and to check the result of exposure compensation, with the result of exposure compensation being reflected on the live-view image. Thus, it may widen the range in which a result of the exposure compensation can be checked, and may realize accurate exposure.

It should be noted that the setting screen of FIG. 5 has illustrated the unlimited range without upper or lower limits. However, for example, in cases where the range from −3.0 EV to +3.0 EV was set as the limited range, the widened range in which exposure compensation becomes available in this case may be any range which is wider than the limited range, such as, for example, a range from −5.0 EV to +5.0 EV. Even in cases where setting of exposure compensation is available within such a range, it may widen the range in which a result of the exposure compensation can be checked, as compared to the limited range.

Referring back to the flowchart of FIG. 4, in the step S91, if it is determined that the AE lock is disabled, the process goes to the step S93. In the step S93, the exposure compensation unit 19 allows setting the range of available exposure compensation within the limited range that does not affect photometry by the photometry unit 17.

Figure 6:
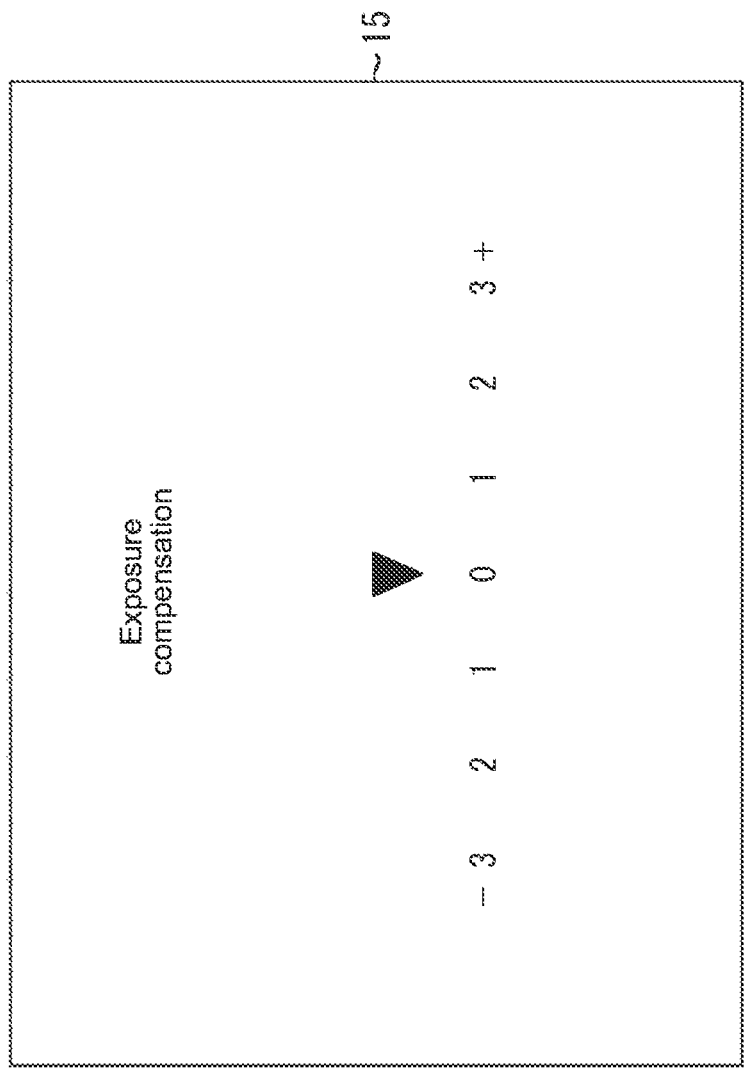
FIG. 6 is a figure showing a specific example of exposure compensation setting when AE lock is disabled.

FIG. 6 is a figure showing an example of the setting screen of exposure compensation of the cases where the AE lock is disabled.

As shown in FIG. 6, the range of available exposure compensation may be set in a plurality of stages depending on EV values, and the range would be a limited range, such as, for example, a range from −3.0 EV to +3.0 EV. In this case, the user is only allowed to set exposure compensation within the limited range that is for keeping accuracy in photometry.

Referring back to the flowchart of FIG. 4, in the process of the step S92 or the step 93, if setting of exposure compensation is finished, the exposure compensation setting processing of FIG. 4 may be completed.

The above is the description of the exposure compensation setting processing.

As described above, according to the present disclosure, by widening the range in which a result of the exposure compensation can be checked in cases where photometry is fixed, it becomes possible to realize accurate exposure. Specifically, by allowing the range of available exposure compensation without limiting the range, this allows setting practically infinite range of exposure compensation without being restricted by the limited range that is for keeping accuracy in photometry; and allows the result of exposure compensation to be reflected on the live-view image to be checked.

In addition, according to the present disclosure, in cases where setting of exposure compensation has been performed by the user's operation, it is possible to switch the range of available exposure compensation depending on whether photometry by the photometry unit 17 is enabled or disabled. Further, according to the present disclosure, upon live-view displaying, it is possible to switch, depending on whether photometry by the photometry unit 17 is enabled or disabled, the range in which the exposure value that would be used for exposure control can be compensated, which exposure control is performed on the captured image obtained from the image sensor 12.

It should be noted that, although the digital still camera has been illustrated in the description above, the present disclosure may also be applied to other imaging apparatuses having an imaging function, for example, to digital video cameras and the like.

<Description of Computer to which the Present Disclosure is Applied>

The series of processing described above may be executed either by hardware or by software. When the series of processing is executed by the software, a program composing the software is installed in a computer. Here, the computer, for example, includes a computer incorporated in dedicated hardware, and a general-purpose personal computer which can execute various kinds of functions by installing therein various kinds of programs.

Figure 7:
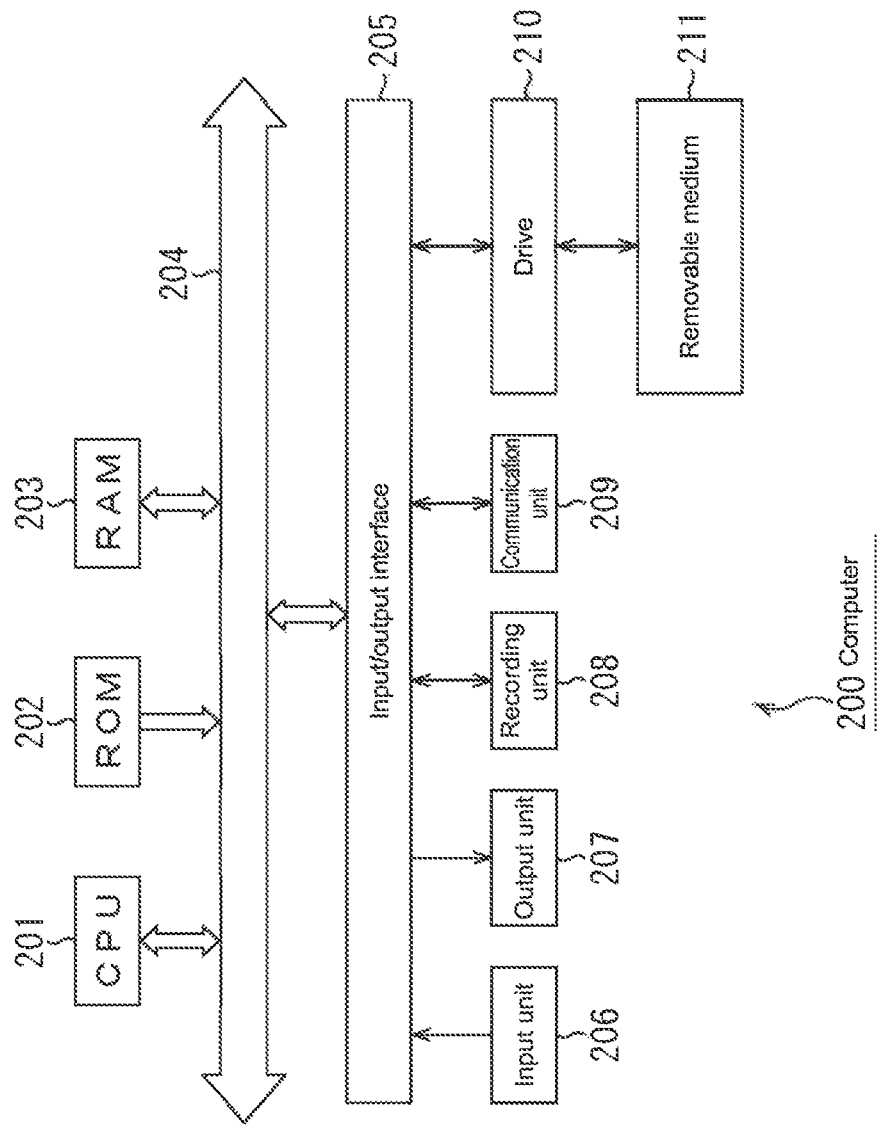
FIG. 7 is a figure showing a configuration example of a computer.

FIG. 7 is a block diagram showing a configuration of hardware of a computer for executing the series of processing described above in accordance with a program.

In the computer 200, a CPU (Central Processing Unit) 201, a ROM (Read Only Memory) 202, and a RAM (Random Access Memory) 203 are connected to one another through a bus 204.

An input/output interface 205 is also connected to the bus 204. An input unit 206, an output unit 207, a recording unit 208, a communication unit 209 and a drive 210 are connected to the input/output interface 205.

The input unit 206 may include a keyboard, a mouse, a microphone, and the like. The output unit 207 may include a display, a speaker, and the like. The recording unit 208 may include a hard disk, a non-volatile memory, and the like. The communication unit 209 may include a network interface and the like. The drive 210 is configured to drive a removable medium 211 which may be a magnetic disc, an optical disc, a magneto optical disc, a semiconductor memory, or the like.

In the computer 200 configured in the manner as described above, for example, the CPU 201 loads the program stored in the recording unit 208 into the RAM 203 through the input/output interface 205 and the bus 204 in order to execute the program, thereby executing the series of processing described above.

The program which the computer 200 (the CPU 201) executes, for example, may be provided by being recorded on the removable medium 211 which is a package medium or the like. In addition, the program may be provided through wired or wireless transmission media such as a Local Area Network, the Internet, and digital satellite broadcasting.

In the computer 200, the program may be installed in the recording unit 208 through the input/output interface 205, by mounting the removable medium 211 to the drive 210. In addition, the program may be received at the communication unit 209 through the wired or wireless transmission media to be installed in the recording unit 208. Further, the program may have been previously installed in the ROM 202 or in the recording unit 208.

It should be noted that the program which the computer 200 executes may be a program in accordance with which predetermined pieces of processing are executed in a time series manner along the order described herein, or may be a program in accordance with which the predetermined pieces of processing are executed in parallel or at a necessary timing such as when a call is made.

Herein, the processing steps describing the program in accordance with which the computer 200 is caused to execute the various kinds of processing are not necessarily processed in a time series manner along the order which is described as the flow chart. The processing steps may also include pieces of processing which are executed in parallel or executed individually (for example, parallel processing or object processing).

In addition, the program may be one which is processed by a single computer, or may be one which is processed by a plurality of computers in a distributed manner. Moreover, the program may also be transferred to a remote computer to be executed by the remote computer.

It should be noted that the present disclosure is not limited to each of the foregoing embodiments but can be modified within the scope without departing from the gist of the present disclosure.

For example, the present disclosure may employ a configuration of Cloud Computing in which one function is shared among a plurality of apparatuses or devices through a network, and the plurality of apparatuses or devices cooperatively execute one function through the network.

The steps described with reference to the flow chart described above may be executed by one apparatus or device, or may be shared among a plurality of apparatuses or devices to be executed as well.

In addition, in cases where a plurality of pieces of processing are contained in one step, the plurality of pieces of processing contained in one step may be executed by one apparatus or device, or may be shared among a plurality of apparatuses or devices to be executed as well.

The present disclosure may employ the following configurations.

(1) An imaging apparatus including:
an imaging unit configured to image a subject;
a photometry unit configured to perform photometry, based on an output of the imaging unit, to obtain an exposure value;
an exposure compensation unit configured to compensate the exposure value that has been obtained by photometry to an exposure value that would be used for exposure control, in cases where photometry of the photometry unit is not fixed;
an exposure control unit configured to
control exposure for a captured image that is imaged by the imaging unit and
allow exposure control at an exposure value within a range which is wider than a range of available exposure values of the cases where photometry of the photometry unit was not fixed, in cases where photometry of the photometry unit is fixed; and
a display control unit configured to control display of the captured image on a display unit.

(2) The imaging apparatus according to (1), in which the display control unit is configured to display on the display unit the captured image on which a result of exposure compensation is reflected.

(3) The imaging apparatus according to (1) or (2), in which
the exposure compensation unit is configured to allow setting a range of available exposure compensation within a range which is wider than a range of available exposure compensation of the cases where photometry of the photometry unit was not fixed.

(4) The imaging apparatus according to (3), further including:
 AE lock for fixing photometry of the photometry unit to fix exposure;
 in which,
 if the AE lock is enabled, the exposure compensation unit allows setting the range of available exposure compensation within a range which is wider than the range of available exposure compensation of the cases where photometry of the photometry unit was not fixed; and
 if the AE lock is disabled, the exposure compensation unit allows setting the range of available exposure compensation within the range of available exposure compensation of the cases where photometry of the photometry unit was not fixed.

(5) The imaging apparatus according to (4), in which
 the exposure compensation unit is configured to allow setting the range of available exposure compensation without limiting the range, if the AE lock is enabled.

(6) The imaging apparatus according to (4) or (5), further including:
 a switching unit configured to switch to enable and disable the AE lock.

(7) The imaging apparatus according to any one of (3) to (6), in which
 the range of available exposure compensation is set in a plurality of stages depending on EV values.

(8) A control method performed by an imaging apparatus having an imaging unit for imaging a subject, the method including:
 performing photometry, based on an output of the imaging unit, to obtain an exposure value;
 compensating the exposure value that has been obtained by photometry to an exposure value that would be used for exposure control, in cases where photometry of the photometry unit is not fixed;
 controlling exposure for a captured image;
 controlling display of the captured image on a display unit; and
 allowing exposure control at an exposure value within a range which is wider than a range of available exposure values of the cases where photometry of the photometry unit was not fixed, in cases where photometry of the photometry unit is fixed.

(9) A program causing a computer to perform a process of controlling an imaging apparatus having an imaging unit for imaging a subject, the process including:
 performing photometry, based on an output of the imaging unit, to obtain an exposure value;
 compensating the exposure value that has been obtained by photometry to an exposure value that would be used for exposure control, in cases where photometry of the photometry unit is not fixed;
 controlling exposure for a captured image;
 controlling display of the captured image on a display unit; and
 allowing exposure control at an exposure value within a range which is wider than a range of available exposure values of the cases where photometry of the photometry unit was not fixed, in cases where photometry of the photometry unit is fixed.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
 an image sensor configured to output an image signal; and
 circuitry configured to:
  generate a live view image from the image signal;
  execute an exposure control such that a result of the exposure control is reflected on the live view image;
  set a first range of control by the exposure control to a first exposure compensation range based on an Auto Exposure (AE) lock function that is enabled;
  set a second range of control by the exposure control to a second exposure compensation range based on the AE lock function that is disabled,
  wherein the second exposure compensation range is narrower than the first exposure compensation range; and
  output, to a display, one of a first live view image or a second live view image as the live view image,
  wherein a first exposure compensation is applied to the first live view image based on a first exposure compensation value set within the first exposure compensation range based on the AE lock function that is enabled, and
  wherein a second exposure compensation is applied to the second live view image based on a second exposure compensation value set within the second exposure compensation range based on the AE lock function that is disabled.

2. The imaging apparatus according to claim 1, wherein the AE lock function is enabled based on a halfway press operation of a shutter button.

3. The imaging apparatus according to claim 1, wherein the circuitry is further configured to determine exposure values based on the image signal.

4. The imaging apparatus according to claim 3, wherein the first exposure compensation range is set in a plurality of stages based on the exposure values.

5. The imaging apparatus according to claim 3, wherein the exposure values are based on at least one of sensitivity of the image sensor, shutter speed of the image sensor, or an aperture value of a lens aperture of the image sensor.

6. The imaging apparatus according to claim 1, wherein the circuitry is further configured to switch status of the AE lock function based on a halfway press operation of a shutter button.

7. An imaging method, comprising:
 outputting, via an image sensor, an image signal;
 generating a live view image from the image signal;
 executing an exposure control such that a result of the exposure control is reflected on the live view image;
 setting a first range of control by the exposure control to a first exposure compensation range based on an Auto Exposure (AE) lock function that is enabled;
 setting a second range of control by the exposure control to a second exposure compensation range based on the AE lock function that is disabled,
 wherein the second exposure compensation range is narrower than the first exposure compensation range; and
 outputting, to a display, one of a first live view image or a second live view image as the live view image,
 wherein a first exposure compensation is applied to the first live view image based on a first exposure compensation value set within the first exposure compensation range based on the AE lock function that is enabled, and
 wherein a second exposure compensation is applied to the second live view image based on a second exposure compensation value set within the second exposure compensation range based on the AE lock function that is disabled.

8. The imaging method according to claim 7, wherein the AE lock function is enabled based on a halfway press operation of a shutter button.

9. The imaging method according to claim 7, further comprising determining exposure values based on the image signal.

10. The imaging method according to claim 9, wherein the first exposure compensation range is set in a plurality of stages based on the exposure values.

11. The imaging method according to claim 9, wherein the exposure values are based on at least one of sensitivity of the image sensor, shutter speed of the image sensor, or an aperture value of a lens aperture of the image sensor.

12. The imaging method according to claim 7, further comprising switching status of the AE lock function based on a halfway press operation of a shutter button.

13. A non-transitory computer-readable medium having stored thereon, computer-executable instructions which, when executed by a computer, cause the computer to execute operations, the operations comprising:
outputting an image signal;
generating a live view image from the image signal;
executing an exposure control such that a result of the exposure control is reflected on the live view image;
setting a first range of control by the exposure control to a first exposure compensation range based on an Auto Exposure (AE) lock function that is enabled;
setting a second range of control by the exposure control to a second exposure compensation range based on the AE lock function that is disabled,
wherein the second exposure compensation range is narrower than the first exposure compensation range; and
outputting one of a first live view image or a second live view image as the live view image,
wherein a first exposure compensation is applied to the first live view image based on a first exposure compensation value set within the first exposure compensation range based on the AE lock function that is enabled, and
wherein a second exposure compensation is applied to the second live view image based on a second exposure compensation value set within the second exposure compensation range based on the AE lock function that is disabled.

14. The non-transitory computer-readable medium according to claim 13, wherein the AE lock function is enabled based on a halfway press operation of a shutter button.

15. The non-transitory computer-readable medium according to claim 13, further comprising determining exposure values based on the image signal.

16. The non-transitory computer-readable medium according to claim 15, wherein the first exposure compensation range is set in a plurality of stages based on the exposure values.

17. An imaging apparatus, comprising:
an image sensor configured to output an image signal; and
circuitry configured to:
display, on a display unit, a first setting screen of a first exposure compensation,
wherein the first exposure compensation is based on an Auto Exposure (AE) lock function that is enabled such that a first range of control by exposure control is set to a first exposure compensation range; and
display, on the display unit, a second setting screen of a second exposure compensation,
wherein the second exposure compensation is based on the AE lock function that is disabled such that a second range of control by the exposure control is set to a second exposure compensation range, and
wherein the second exposure compensation range is narrower than the first exposure compensation range;
set one of a first exposure compensation value within the first exposure compensation range or a second exposure compensation value within the second exposure compensation range based on a user input,
generate a live view image based on the image signal;
execute the exposure control such that a result of the exposure control is reflected on the live view image;
output, to the display unit, a first live view image as the live view image, wherein the first exposure compensation is applied to the first live view image based on the first exposure compensation value, based on the AE lock function that is enabled; and
output, to the display unit, a second live view image as the live view image, wherein the second exposure compensation is applied to the second live view image based on the second exposure compensation value, based on the AE lock function that is disabled.

18. The imaging apparatus according to claim 17, wherein the AE lock function is enabled based on a halfway press operation of a shutter button.

19. The imaging apparatus according to claim 17, wherein the circuitry is further configured to determine exposure values based on the image signal.

20. The imaging apparatus according to claim 19, wherein the first exposure compensation range is set in a plurality of stages based on the exposure values.

* * * * *